(12) United States Patent
Hambitzer

(10) Patent No.: US 11,276,882 B2
(45) Date of Patent: Mar. 15, 2022

(54) ELECTROLYTE FOR RECHARGEABLE ELECTROCHEMICAL BATTERY CELLS

(71) Applicant: FORTU NEW BATTERY TECHNOLOGY GMBH, Bonn (DE)

(72) Inventor: Gunther Hambitzer, Bonn (DE)

(73) Assignee: HPB LIQUID ELECTROLYTE UG, Bonn (DE)

( * ) Notice: Subject to any disclaimer, the term of this patent is extended or adjusted under 35 U.S.C. 154(b) by 472 days.

(21) Appl. No.: 16/092,306

(22) PCT Filed: Apr. 12, 2017

(86) PCT No.: PCT/EP2017/058820
§ 371 (c)(1),
(2) Date: Apr. 3, 2019

(87) PCT Pub. No.: WO2017/178543
PCT Pub. Date: Oct. 19, 2017

(65) Prior Publication Data
US 2019/0260074 A1    Aug. 22, 2019

(30) Foreign Application Priority Data
Apr. 14, 2016 (DE) ..................... 10 2016 106 947.7

(51) Int. Cl.
| | |
|---|---|
| H01M 10/0563 | (2010.01) |
| H01M 4/485 | (2010.01) |
| H01M 10/0525 | (2010.01) |
| H01M 10/0568 | (2010.01) |
| H01M 10/0567 | (2010.01) |
| C01F 7/68 | (2006.01) |
| H01M 4/525 | (2010.01) |
| H01M 4/587 | (2010.01) |
| H01M 4/38 | (2006.01) |
| H01M 4/58 | (2010.01) |

(52) U.S. Cl.
CPC ........... *H01M 10/0563* (2013.01); *C01F 7/68* (2013.01); *H01M 4/485* (2013.01); *H01M 10/0525* (2013.01); *H01M 10/0567* (2013.01); *H01M 10/0568* (2013.01); *H01M 4/386* (2013.01); *H01M 4/525* (2013.01); *H01M 4/587* (2013.01); *H01M 4/5825* (2013.01); *Y02T 10/70* (2013.01)

(58) Field of Classification Search
CPC .................................................. H01M 10/563
See application file for complete search history.

(56) References Cited

U.S. PATENT DOCUMENTS

| | | |
|---|---|---|
| 4,362,794 A | 12/1982 | Abraham |
| 2010/0283429 A1 | 11/2010 | Ofer et al. |
| 2012/0077070 A1 | 3/2012 | Soloveichik et al. |
| 2012/0308876 A1 | 12/2012 | Hambitzer et al. |
| 2020/0411903 A1* | 12/2020 | Hambitzer .............. C01F 7/68 |

FOREIGN PATENT DOCUMENTS

| | | | |
|---|---|---|---|
| EP | 0 191 569 | * | 8/1986 |
| EP | 1923934 A | | 5/2008 |
| FR | 2 556 506 | * | 6/1985 |

OTHER PUBLICATIONS

Berg, R.W., Von Wimbush, S., Bjerrum, N.J.—Negative Oxidation States of the Chalcogens in Molten Salts.1. Raman Spectroscopic Studies on Aluminum Chlorosulfides Formed in Chloride and Chloroaluminate Melts and Some Related Solid and Dissolved Compounds, Inorg. Chem. 1980, 19, 2688-2698 (Year: 1980).*
Abraham, et al. "Some Chemistry in the Li/SOCl2 Cell" Journal of the Electrochemical Society, Oct. 1980, 6 pages.
International Search Report issued in PCT/EP2017/058820 dated Jun. 6, 2017.

* cited by examiner

*Primary Examiner* — Anca Eoff
(74) *Attorney, Agent, or Firm* — Workman Nydegger

(57) ABSTRACT

An electrolyte for a rechargeable non-aqueous electrochemical battery cell having a negative electrode and a positive electrode is described. The electrolyte contains sulfur dioxide and comprises a conducting salt, and a battery cell therefore has almost no capacitance loss over the cycles. Furthermore, a corresponding battery cell and a method for producing the electrolyte are described.

21 Claims, 1 Drawing Sheet

ELECTROLYTE FOR RECHARGEABLE ELECTROCHEMICAL BATTERY CELLS

CROSS-REFERENCE TO RELATED APPLICATIONS

The present application is a 371 US Nationalization of International Patent Application No. PCT/EP2017/058820, filed Apr. 12, 2017, which claims priority to German Patent Application No. 10 2016 106 947.7, filed Apr. 14, 2016, the entire disclosures of which are incorporated herein by reference.

BACKGROUND OF THE INVENTION

1. Field of the Invention

The invention relates to an electrolyte for a non-aqueous rechargeable electrochemical battery cell with a positive and a negative electrode.

2. Description of Related Art

Rechargeable battery cells are of great importance in many technical fields. They are widely used in mobile applications, such as for example mobile telephones, notebooks and electric vehicles.

In addition, there is a great demand for battery cells for stationary applications such as network stabilization, network buffering, and decentralized power supply.

There is a great need for improved rechargeable battery cells that in particular meet the following requirements:
- safety through non-inflammability;
- long service life, i.e. long calendar life;
- long cycle life, i.e. a very large number of usable charging and discharging cycles, even in cases of high available power output, i.e. high power density;
- high energy efficiency ratio through the entire service life;
- highly favorable electric power data, in particular high specific energy (Wh/kg) or
- high energy density (Wh/l) with simultaneous high power density (W/l);
- the lowest possible production costs, i.e. preferred use of economical and readily available materials; and
- low costs per kilowatt hour obtained from the battery cell.

Rechargeable battery cells are known which, in particular in order to achieve non-inflammability, comprise sulfur-dioxide-containing electrolytes. Such battery cells are known from publications such as WO 2015/067795 and WO 2005031908, in which lithium cobalt oxide or lithium iron phosphate is proposed as an active metal. In this case, a solvate (LiAlCl$_4$×n SO$_2$) composed of lithium tetrachloroaluminate (LiAlCl$_4$) and sulfur dioxide (SO$_2$) is used as an electrolyte, wherein at n=1.5, the vapor pressure of the SO$_2$ is below 0.1 bar, and at n≥4.5, it is over 2 bar. Such electrolytes can be produced in the conventional manner from lithium chloride, aluminum chloride, and sulfur dioxide. Related production methods require that the electrolyte obtained be dry. In particular, this requires complex methods for drying the substances used in production, in particular the strongly hygroscopic lithium chloride or mixtures of melts of lithium chloride and aluminum chloride.

In an SO$_2$-containing electrolyte of lithium tetrachloroaluminate and sulfur dioxide, electrode potentials are measured versus metallic lithium (vs. Li/Li$^+$), which is immersed in the electrolyte.

In such battery cells with an SO$_2$-containing electrolyte, on the surface of a negative electrode, i.e. for example on the surface of graphite, reduction of sulfur dioxide (of the electrolyte) to lithium dithionite takes place at potentials of less than or equal to 3 V vs. Li/Li$^+$. In this reaction, at least one monolayer of lithium dithionite as a cover layer forms on the surface of the negative electrode according to the following formula and for 3.0 V vs. Li/Li$^+$:

$$2Li^- + 2e^- + 2SO_2 <-> Li_2S_2O_4 \quad \text{(Eq. I)}$$

Such a cover layer of lithium dithionite remains stable through lithium deposition. However, if a lithium dithionite molecule of this layer is converted, another is immediately formed on the surface of the negative electrode, as long as the potential of the negative electrode is less than or equal to 3.0 V vs. Li/Li$^+$. If the potential of such an electrode, to which at least one monolayer of the cover layer of lithium dithionite adheres, is constantly maintained in an SO$_2$-containing electrolyte at a potential below 3.0 V, for example using a correspondingly connected device such as for example a potentiostat, a decreasing current can be observed. This decreasing current corresponds to the self-discharge of the graphite electrode. At a lower temperature and with an electrolyte having a higher SO$_2$ content, this self-discharge current is less than at a higher temperature and a lower SO$_2$ content. Although lithium dithionite on the surface of the negative electrode is a stable molecule, this self-discharge reaction shows that the lithium dithionite is chemically converted, and this is followed by regeneration of lithium dithionite that can be derived from the potential level, wherein electrolyte is consumed.

Moreover, it was found that an electrolyte produced with a stoichiometric excess of aluminum chloride increases the self-discharge current of the graphite electrode mentioned here by way of example. Moreover, it was found that in the potential range of less than 4 V vs. Li/Li$^+$, conversion of lithium dithionite in the sense of a self-discharge reaction occurs after only a single reaction sequence. This reaction sequence begins with autodissociation of the dissolved conducting salt, which is shown schematically in the following reaction equation, taking as an example the solvate LiAlCl$_4$× 2SO$_2$:

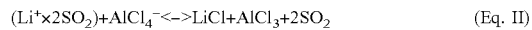
$$(Li^+ \times 2SO_2) + AlCl_4^- <-> LiCl + AlCl_3 + 2SO_2 \quad \text{(Eq. II)}$$

Eq. II shows that the small, strongly solvated lithium ion reacts with a chloride of the tetrachloroaluminate anion, releasing sulfur dioxide, to yield dissolved aluminum chloride and solid lithium chloride. The lithium chloride precipitates in this process. Under normal conditions, the equilibrium lies almost completely to the left. An increase in temperature and a decrease in SO$_2$ can shift the equilibrium to the right.

Moreover, it was found that the lithium dithionite further reacts with the aluminum chloride according to the formula

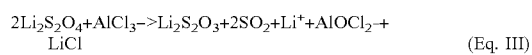
$$2Li_2S_2O_4 + AlCl_3 -> Li_2S_2O_3 + 2SO_2 + Li^+ + AlOCl_2 + LiCl \quad \text{(Eq. III)}$$

and further via the thiosulfate LiS$_2$O$_3$ according to

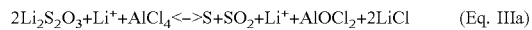
$$2Li_2S_2O_3 + Li^+ + AlCl_4^- <-> S + SO_2 + Li^+ + AlOCl_2 + 2LiCl \quad \text{(Eq. IIIa)}$$

to sulfur, sulfur dioxide, dissolved lithium ions, and aluminum oxychlorides, as well as lithium chloride, wherein the lithium chloride is precipitated.

Moreover, it was found that the sulfur formed at the potentials common at the negative electrode of less than approx. 2.0 V vs. Li/Li$^+$ is further reduced to lithium sulfide. The total gross reaction is then as follows:

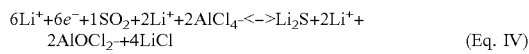
(Eq. IV)

In this reaction, the charge consumption due to regeneration of lithium dithionite is not taken into account in the formula.

The conversion of tetrachloroaluminate anions according to the reaction described by Eq. II and those given below causes electrolyte to be consumed. In order to ensure that sufficient electrolyte is present in the battery cell during the service life of such a conventional battery cell, the conventional battery cell is initially filled with a correspondingly large amount of electrolyte.

Moreover, the electrolyte must not contain any substance that causes or promotes the conversion of lithium dithionite and thus reduces the capacitance of the battery cell due to regeneration of the lithium dithionite and the accompanying consumption of lithium. Consequently, the electrolyte must in particular not contain any chlorine or chlorine-releasing solvents such as thionyl- or sulfuryl chloride.

In particular, thionyl chloride causes the formation of a passivating cover layer of lithium chloride that grows over time on the negative electrode, which in any event counteracts the desired formation of the lithium dithionite layer.

The above-described self-discharge reaction causes battery cells with known SO$_2$-containing electrolytes to undergo quite considerable capacitance loss from the first charging cycle on. Because of this reaction and the accompanying consumption of lithium ions or electric charge, in the production of such conventional battery cells, one introduces as a rule more of the acute positive substance, usually twice as much. Beginning with the first cycles, the self-discharge reaction causes the capacitance of such a conventional cell to be reduced by almost half. For this reason, such battery cells are frequently cycled before being put into service, i.e. charged and discharged so that the precycled battery cells no longer show major capacitance drop. The capacitance of such precycled cells is frequently defined as 100%. In the further charging and discharging cycles, the capacitance then drops more slowly to approx. 30%.

BRIEF SUMMARY OF THE INVENTION

Based on these drawbacks of the prior art, the object of the invention is to provide an electrolyte for a battery cell that solves or at least alleviates the problems described in connection with the prior art.

According to the invention, this is achieved by the objects defined in the independent claims, wherein preferred embodiments are given in the dependent claims.

DETAILED DESCRIPTION OF THE INVENTION

Figure 1:
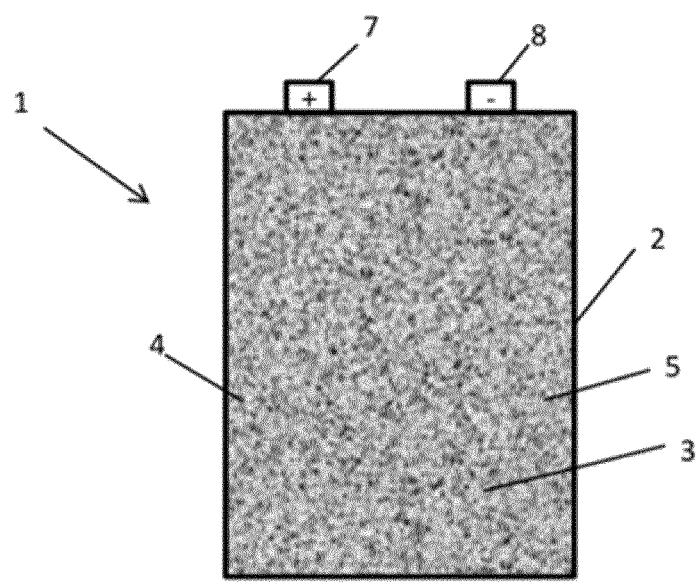
FIG. 1 shows a general diagram of a rechargeable battery.

FIG. 1 shows a general diagram of a rechargeable battery 1 with a housing 2 and at least one battery cell 3, which has a positive electrode 4 and a negative electrode 5. Here, the electrodes 4, 5 are connected via dissipation elements, optionally via electrode terminals commonly used in battery technology, with terminal contacts 7, 8 via which the battery can finally be charged or discharged.

Lithium metal oxides, such as LiCoO$_2$, LiNiFeCoO$_2$ or Li$_3$V$_3$O$_8$, or alternatively lithium metal phosphates such as LiFePO$_4$ are preferably used as active positive materials. The active negative material can preferably be graphite, another type of carbon, lithium titanium oxide (Li$_4$Ti$_5$O$_{12}$, LTO), or silicon (Si).

In the battery 1, a sulfur-dioxide-containing electrolyte is used that comprises at least a first conducting salt with the stoichiometric formula K(ASX$_2$)$_p$. Here, the abbreviation K denotes a cation from the group of the alkali metals (in particular Li, Na, K, Rb, Cs) or the alkaline earth metals (in particular Be, Mg, Ca, Sr, Ba) or the zinc group (i.e. the twelfth group of the periodic table, in particular Zn, Cd, Hg). If K is selected from the group of the alkali metals, p=1. If K is selected from the group of the alkaline earth metals or the zinc group, p=2. The abbreviation A denotes an element from the third main group of the periodic table, in particular boron, aluminum, gallium, indium, and thallium, and the abbreviation X denotes a halogen, in particular fluorine, chlorine, bromine, or iodine. S denotes sulfur. K preferably denotes Li. Particularly preferably, the first conducting salt has the stoichiometric formula LiAlSCl$_2$, i.e. the first conducting salt is preferably lithium sulfodichloroaluminate.

The electrolyte according to the invention comprises a first conducting salt dissolved in sulfur dioxide as an "SO$_2$-containing" electrolyte. Here, this term refers to an electrolyte that does not comprise sulfur dioxide as an additive in a low concentration, but in which the mobility of the ions of the first conducting salt, which is contained in the electrolyte and effects charge transfer, is at least partially ensured by the SO$_2$.

An advantage of this non-aqueous inorganic SO$_2$-containing electrolyte is that—in contrast to the organic electrolyte solutions of the lithium-ion cells in common practical use—it is not flammable. The known safety risks of lithium-ion cells are caused in particular by their organic electrolyte solution. When a lithium-ion cell catches fire or even explodes, the organic solvent of the electrolyte solution is the flammable material. An electrolyte according to the invention is preferably substantially free of organic materials, wherein "substantially" is to be understood as meaning that the amount of any organic materials present is so low that they constitute no safety hazard.

It has been found to be favorable if the electrolyte according to the invention is substantially free of substances that corrode, dissolve, or otherwise decompose or damage the desired lithium dithionite layer. The term "substantially free" is to be understood here as meaning that the substance is at most present in such a small amount that it does not decompose/damage the lithium dithionite layer. Examples of such substances that should not be present are oxidants such as chlorine, thionyl chloride, and sulfuryl chloride.

The electrolyte according to the invention comprises the first conducting salt dissolved in SO$_2$ of the formula K(ASX$_2$)$_p$, described above in greater detail. Here, SO$_2$ can be used in the purest form possible, i.e. with the lowest possible content of impurities.

In a preferred embodiment, a concentration of the first conducting salt in SO$_2$ is at least 10$^{-4}$ mol/l, in particular at least 10$^{-3}$ mol/l, in particular at least 10$^{-2}$ mol/l, in particular at least 10$^{-2}$ mol/l, and in particular at least 1 mol/l.

In a preferred embodiment, in addition to the first conducting salt, the sulfur-dioxide-containing electrolyte can further comprise a second conducting salt with the stoichiometric formula K(AX$_4$)$_p$ and/or a further conducting salt with the stoichiometric formula $K(AOX_2)_p$. The second conducting salt and/or the third conducting salt are/is preferably dissolved in $SO_2$. For the letters K, A, X and p used here as abbreviations, one may insert elements according to the above-described selection criteria. In this case, it is preferable, but not required, to select the same elements for all of the conducting salts used. O denotes oxygen.

In particular, an embodiment is preferred in which the sulfur-dioxide-containing electrolyte is free of substances with the stoichiometric formula $KAX_4$, in particular free of $LiAlCl_4$, wherein the letter abbreviations K, A and X again refer to elements according to the above-described element groups. The sulfur-dioxide-containing electrolyte should preferably be free of all substances that fulfill the stoichiometric formula $KAX_4$ in any combination of the elements described by the above abbreviations. Alternatively, the sulfur-dioxide-containing electrolyte should preferably at least be free of the substance with the stoichiometric formula $KAX_4$ obtained by inserting the elements selected for the first conducting salt.

However, if a small amount of $KAX_4$ is present in the sulfur-dioxide-containing electrolyte, this will be consumed after the above-described self-discharge reaction.

Remarkably, if a substance $KAX_4$, in particular $LiAlCl_4$, is not present in the electrolyte, a self-discharge according to the above-described equations or an analogous equation does not take place with or in the electrolyte according to the invention, provided that the letters K, A and X do not denote lithium or aluminum or chlorine. In this case, the electrolyte is not consumed. Moreover, no consumption of lithium ions or electric charge takes place, nor do any sparingly soluble or precipitating salts form. Consequently, even for long-term operation of the battery cell, it is sufficient if the cell is initially filled only with a significantly reduced amount of electrolyte compared to conventional battery cells filled with $SO_2$-containing electrolytes. Compared to conventional battery cells filled with $SO_2$-containing electrolytes, the amount of electrolyte to be used in production of the cell can be reduced to one-third.

With the new electrolyte, a reaction according to the above-discussed equation (Eq. IV) does not take place. Advantageously, therefore, the additional introduction of an electric charge or an amount of lithium ions in order to compensate for the self-discharge according to the equation (Eq. IV) can be dispensed with. Accordingly, the capacitances of the electrodes can be dimensioned in a more customized manner. Moreover, the amount of the electrolyte with which the battery is to be filled can be correspondingly reduced, as it is no longer consumed and poorly soluble salts such as lithium chloride no longer precipitate, and accordingly no longer plug the pores of the negative electrode and thus increase the internal resistance.

The amount of the ion-conducting electrolyte involved in the charging and discharging processes is thus kept almost completely constant during the entire service life of the battery cell. In particular, a reduction in the amount of electrolyte can be achieved in the preferred embodiment, in which the positive electrode has a porosity of less than 25%, less than 20%, less than 15%, and alternatively, in particular less than 12%. Alternatively or additionally, it is preferred in a further embodiment for the negative electrode to have a porosity of less than 25%, less than 20%, less than 15%, and alternatively, in particular less than 12%.

A reduction in the porosity of an electrode corresponding to the reduced amount of electrolyte can be achieved in particular by proportionally adding to the respective electrode, which is preferably composed of particles of diameter R, particles of the same material but a smaller diameter, in particular R/3. This causes the smaller particles to be placed in the interstices between the larger particles. In addition to the lower porosity, such electrodes can also show higher mechanical stability.

By using the electrolyte described, and by decreasing the porosity from e.g. 30% to 12%, the specific energy and the energy density of the battery cell can be increased from the 65 Wh/kg or 200 Wh/l of a conventional precycled battery cell to over 155 Wh/kg or over 470 Wh/l. The nominal capacity for a prismatic cell with the external dimensions of 130 mm×130 mm×24.5 mm can thus be increased, e.g. from the approximately 22 Ah of a conventional precycled battery cell to over 61 Ah.

The capacity decrease with the number of cycles is sharply reduced by using the electrolyte according to the invention. In this manner, a self-discharge is suppressed to such an extent that it is practically no longer detectable.

A further aspect of the invention relates to a method for the production of a sulfur-dioxide-containing electrolyte according to the invention for use in a battery cell, comprising at least the production of $LiAlSCl_2$ according to the reaction equation $$Li_2S + Li^+ + AlCl_4^- \rightarrow Li^+ + AlSCl_2^- + 2LiCl, \quad \text{(Eq. V)}$$

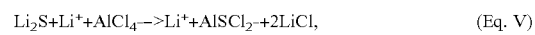

wherein the reaction takes place in liquid $SO_2$ and preferably at a temperature in the range of $-20°$ C. to $-5°$ C., in particular in the range of $-15°$ C. to $-7°$ C., in particular at $-10°$ C. At such a low temperature, and under normal pressure conditions, $SO_2$ is usually liquid.

The reaction described by the equation (Eq. V) is preferably carried out by addition of fine-grained, in particular anhydrous, $Li_2S$ to $LiAlCl_4$ dissolved in $SO_2$, which is preferably stirred during this process. The reaction is exothermic. Preferably, $Li_2S$ is added in a substance amount that is equimolar, i.e. identical to the substance amount of the $LiAlCl_4$ present. If more $Li_2S$ is added, $LiAlS_2$ precipitates as a dark sediment. Conversely, if less $Li_2S$ is added, this yields a mixture of $LiAlSCl_2$ and $LiAlCl_4$. The ratio of the dissolved $LiAlSCl_2$ and dissolved $LiAlCl_4$ can therefore be adjusted by means of the amount of lithium sulfide, $Li_2S$, added. After completion of the reaction, the LiCl, which precipitates as a white sediment, is preferably filtered off.

A further aspect of the invention relates to a further, alternative method for the production of a sulfur-dioxide-containing electrolyte according to the invention for use in a battery cell, comprising at least the production of $LiAlSCl_2$ according to the reaction equation $$Li_2S + AlCl_3 \rightarrow Li^+ + AlSCl_2^- + LiCl, \quad \text{(Eq. VI)}$$

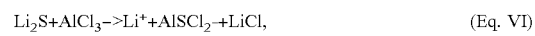

wherein the reaction takes place in liquid $SO_2$ and preferably at a temperature in the range of $-20°$ C. to $-5°$ C., in particular in the range of $-15°$ C. to $-7°$ C., in particular at $-10°$ C.

The production of the sulfur-dioxide-containing electrolyte can also take place at temperatures above $-10°$ C. provided that the $SO_2$ is placed under corresponding pressure, as $SO_2$ is no longer liquid at temperatures of greater than $-10°$ C. under normal pressure, i.e. at a standard atmospheric pressure of 1013.25 hPa. As a higher temperature increases the reaction rate according to Equation V or Equation VI below, the reaction can take place more rapidly under simultaneous pressurization of the reactants, wherein the pressure must be high enough that the $SO_2$ remains liquid at the given temperature in question. In this manner, production of the electrolyte can be carried out more rapidly. In particular, production of the electrolyte, i.e. the reaction according to Equation V or VI, can be carried out at temperatures between 0° C. and 50° C. or above and at a respectively corresponding suitably high pressure. In particular, production can thus be carried out at a temperature of 0° C. and a pressure of greater than 1.8 bar, at a temperature of 20° C. and a pressure of greater than 3.6 bar, at a temperature of 40° C. and a pressure of greater than 6 bar, at a temperature of 60° C. and a pressure of greater than 10 bar, or at even higher temperatures and a suitably high pressure. In this case, the temperature conditions and respective pressures given here are to be understood as guideline values, wherein the person having ordinary skill in the art knows that the conditions also depend on further components.

The reaction described by the equation (Eq. VI) is preferably carried out by adding fine-grained, in particularly anhydrous, $Li_2S$ to a suspension of $AlCl_3$ in liquid $SO_2$, which is preferably stirred during this process. Preferably, $Li_2S$ is added in a substance amount that at most is equal to the substance amount of the $AlCl_3$ present, in particular exactly equal to the substance amount of the $AlCl_3$ present. After completion of the reaction, the LiCl, which precipitates as white sediment, is preferably filtered off.

Instead of filtering off the LiCl, $AlCl_3$ can also be added. This gives rise to $LiAlCl_4$ as a reaction product, wherein the ratio of dissolved $LiAlSCl_2$ to dissolved $LiAlCl_4$ can be adjusted based on the amount of $AlCl_3$ added.

The invention claimed is:

1. A liquid sulfur-dioxide-containing electrolyte for a rechargeable non-aqueous electrochemical battery cell comprising:
at least a first conducting salt with the stoichiometric formula $K(ASX_2)_p$, wherein K denotes a cation from the group of the alkali metals with p=1, the alkaline earth metals with p=2 or the zinc group with p=2, wherein A denotes an element from the third main group of the Periodic Table, S denotes sulfur, X denotes a halogen, and wherein the first conducting salt is dissolved in liquid sulfur dioxide.

2. The electrolyte according to claim 1, wherein a concentration of the first conducting salt in the liquid sulfur dioxide is at least $10^{-4}$ mol/l.

3. The electrolyte according to claim 1, wherein the first conducting salt has the stoichiometric formula $LiAlSCl_2$.

4. The electrolyte according to claim 1, wherein said electrolyte further comprises a second conducting salt with the stoichiometric formula $K(AX_4)_p$, wherein K, A, X, and p are as defined in claim 1, and wherein the second conducting salt is dissolved in the liquid sulfur dioxide.

5. The electrolyte according to claim 1, wherein said electrolyte comprises a further conducting salt with the stoichiometric formula $K(AOX_2)_p$, wherein K, A, X, and p are as defined in claim 1, and wherein the further conducting salt is dissolved in the liquid sulfur dioxide.

6. The electrolyte according to claim 1, wherein said electrolyte is free of substances with the stoichiometric formula $KAX_4$, wherein K, A, and X are as defined in claim 1.

7. A rechargeable non-aqueous electrochemical battery cell, comprising a negative and a positive electrode and an electrolyte according to claim 1.

8. The rechargeable non-aqueous electrochemical battery cell, comprising an electrolyte according to claim 7, wherein the positive electrode has a porosity of less than 25%.

9. The rechargeable non-aqueous electrochemical battery cell comprising an electrolyte according to claim 7, wherein the negative electrode has a porosity of less than 25%.

10. The rechargeable non-aqueous electrochemical battery cell comprising an electrolyte according to claim 7, wherein the negative electrode has a porosity of less than 20%.

11. The rechargeable non-aqueous electrochemical battery cell comprising an electrolyte according to claim 7, wherein the negative electrode has a porosity of less than 15%.

12. The rechargeable non-aqueous electrochemical battery cell comprising an electrolyte according to claim 7, wherein the negative electrode has a porosity of less than 12%.

13. The rechargeable non-aqueous electrochemical battery cell comprising an electrolyte according to claim 7, wherein the positive electrode has a porosity of less than 20%.

14. The rechargeable non-aqueous electrochemical battery cell comprising an electrolyte according to claim 7, wherein the positive electrode has a porosity of less than 15%.

15. The rechargeable non-aqueous electrochemical battery cell comprising an electrolyte according to claim 7, wherein the positive electrode has a porosity of less than 12%.

16. A method for the production of a sulfur-dioxide-containing electrolyte for a rechargeable electrochemical battery cell, comprising:
at least the production of $LiAlSCl_2$ according to the reaction equation $$Li_2S + LiAlCl_4 \rightarrow LiAlSCl_2 + 2LiCl,$$

wherein the reaction takes place in liquid sulfur dioxide.

17. The method according to claim 16, wherein the method is carried out at a temperature of 10° C. to 50° C. and under a pressure at which the $SO_2$ remains liquid at these temperatures.

18. The method according to claim 16, wherein the method is carried out at a temperature of greater than 50° C. and under a pressure at which the $SO_2$ remains liquid at this temperature.

19. A method for the production of a sulfur-dioxide-containing electrolyte for use in a rechargeable battery cell, comprising:
at least the production of $LiAlSCl_2$ according to the reaction equation $$Li_2S + AlCl_3 \rightarrow LiAlSCl_2 + LiCl,$$

wherein the reaction takes place in liquid $SO_2$.

20. The method according to claim 19, wherein the method is carried out at a temperature of 10° C. to 50° C. and under a pressure at which the $SO_2$ remains liquid at these temperatures.

21. The method according to claim 19, wherein the method is carried out at a temperature of greater than 50° C. and under a pressure at which the $SO_2$ remains liquid at this temperature.

* * * * *